Patented Sept. 13, 1932

1,876,726

UNITED STATES PATENT OFFICE

ROWLAND B. MITCHELL, OF ATHOL, MASSACHUSETTS, ASSIGNOR TO ATHOL MANUFACTURING COMPANY, OF ATHOL, MASSACHUSETTS, A CORPORATION OF MASSACHUSETTS

METHOD OF REMOVING DIPHENYLAMINE FROM NITROCELLULOSE POWDER

No Drawing.   Application filed September 19, 1930.   Serial No. 483,138.

My invention relates to a method for removing diphenylamine from nitrocellulose powder, as for example, from so-called pyro powder.

As is well known, nitrocellulose powders contain diphenylamine, which serves as a stabilizer for the powder, but which renders the powder undesirable for redissolving for use in the manufacture of lacquers, artificial leathers, etc., for which purpose surplus or obsolete stocks of powder are available, since the diphenylamine reacts with break-down products of nitrocellulose with the production of dark, greenish yellow salts which affect the color of a lacquer or leather dope after the addition of such pigment as may be added. Further, a lacquer or artificial leather containing diphenylamine or one of its salts will become darkened or yellowed when exposed to sunlight due to the effect of sunlight on the diphenylamine.

Heretofore various methods for the removal of diphenylamine from smokeless powder have been suggested, but such methods have not proved entirely successful for various reasons. For example, various methods, such as those disclosed by the patent to Woodbridge No. 1,439,656, the patent to Pitman and Hunter No. 1,577,075 and the patent to Pitman No. 1,535,438, have contemplated the removal of diphenylamine by extraction with a solvent therefor which is non-solvent of the nitrocellulose. Such methods have been found to be relatively ineffective due to minimum penetration of the powder grains by the diphenylamine solvent. As a further example, it has been suggested (Butts Patent No. 1,650,689) that diphenylamine be extracted from smokeless powder specifically with the use of iso-propyl alcohol which is credited with the capacity for extracting diphenylamine and of swelling the powder grains and hence permitting penetration of the solvent.

Now it is the object of my invention to provide a method whereby diphenylamine and reaction products of diphenylamine and nitrocellulose may be readily and effectively removed from nitrocellulose powder, without any substantial loss of nitrocellulose, and whereby the powder will be rendered available for use in the preparation of lacquers, leather dopes, etc. without producing any discoloration.

In accordance with the method embodying my invention, I subject nitrocellulose powder containing diphenylamine to treatment with an organic liquid which is a solvent of the powder and for the diphenylamine in admixture with a diluent liquid which is a non-solvent of the powder, the two liquids being in such quantities that the nitrocellulose solvent power of the solvent liquid will be reduced by the presence of the non-solvent liquid to a point such that the solvent liquid will function to swell the powder without dissolving any substantial amount of it, and at the same time will efficiently and rapidly extract the diphenylamine, it being noted that where the powder has been suitably swelled by this controlled action of the nitrocellulose solvent, the extraction of the diphenylamine by its solvent proceeds with speed and efficiency. Further, I may use a mixture of two solvents, one of which is a solvent for nitrocellulose and the other of which is a solvent for diphenylamine, the solvent power of the solvent for nitrocellulose being suitably reduced by the addition of a diluent liquid, or by the presence of the solvent for diphenylamine where such is not a solvent for nitrocellulose, to obtain swelling of the powder as compared to dissolving in order to permit efficient penetration and extraction of diphenylamine by the solvent therefor. Still further, I may use a liquid which is a solvent for both nitrocellulose and diphenylamine in admixture with a solvent for diphenylamine, which is a non-solvent for nitrocellulose, the latter solvent being proportioned so as to control the solvent power on nitrocellulose of the former solvent.

In carrying my invention into practice with the use of an organic liquid solvent of both nitrocellulose and diphenylamine, I may use as the solvent, for example, an alcohol having a solvent power on nitrocellulose, as methyl alcohol, isopropyl alcohol, and the like, or ketones, aldehydes, a suitable mixture of ether-alcohol, etc., or mixtures thereof, and as a diluent liquid non-solvent of the nitrocellulose, I may use, for example, a hydrocarbon, as benzol, toluol, xylol, solvent naphtha, gasoline, etc., or carbon tetrachloride, acetylene tetrachloride, etc., etc.

In carrying my invention into practice with the use of a mixture of solvents one of which is a solvent for nitrocellulose and the other of which is a solvent for diphenylamine, I may use as the solvent for nitrocellulose, for example, methyl, ethyl, propyl, butyl, amyl, etc., acetate, acetone, acetone oils, furfural, ether-alcohol mixtures, etc.

As the solvent for diphenylamine, I may use, for example, ethyl, propyl, butyl or amyl alcohol, ether, etc., and I may use any of the above mentioned diluent liquids to control the solvent power of the solvent for nitrocellulose, or where suitable, the solvent for diphenylamine may be proportioned to the solvent for nitrocellulose so as to desirably control its solvent power.

As illustrative of the practical adaptation of my invention for the removal of diphenylamine from, for example, 75 mm. gun powder, discolored by long immersion in ground water and productive of a solution having a dark, yellowish-green color, for example, say 100 gr. of the powder are extracted in a Soxhlet extraction apparatus for a period of about twenty-four hours with a mixture comprising 50 parts of synthetic methanol and 70 parts benzol, at the boiling temperature of the mixture. The powder after extraction, the liquid mixture having been drained off, will be found to be of a light color, to have absorbed about 57% by weight of the extracting mixture which causes a swelling of the powder in excess of 100% and, in fact, of approximately 320%, to be largely freed from diphenylamine and reaction products and to be in a friable condition rendering it easy to dissolve as compared with the hard, horn-like condition of the original powder.

As a further illustration, for example, 100 grains of pyro powder are extracted for a period of about 24 hours in a Soxhlet extracter with a mixture composed of, for example, 25 parts synthetic methanol, 25 parts benzol and special denatured 2 B alcohol 50 parts, this denatured alcohol consisting of 100 parts by volume of ethyl alcohol and ½ part by volume of benzol. The product will be found to be of light color, showing relatively complete extraction of diphenylamine and will be found to have absorbed and held about 34% by weight of the extracting mixture.

It will be understood that in accordance with my invention the time of extraction may be varied widely depending upon the extracting mixtures used and the completeness of extraction desired. It will also be understood that the various proportions of ingredients of the extracting mixture may be widely varied.

It will now be noted that in accordance with my invention, I contemplate the extraction of diphenylamine and reaction products from nitrocellulose powder by means of an organic liquid, a solvent for diphenylamine and for nitrocellulose, the nitrocellulose solvent power of which is controlled or limited to obtain swelling of the powder by the use of a diluent liquid. Further, that I contemplate the use of a mixture of liquids, one a solvent for nitrocellulose, which may or may not be a solvent for diphenylamine, and the other a solvent for diphenylamine, the solvent power of the mixture on nitrocellulose being controlled or limited to obtain swelling of the powder by providing in the mixture a suitable proportion of the solvent for diphenylamine where it is not a solvent for nitrocellulose, or by the inclusion of a diluent liquid non-solvent for nitrocellulose.

What I claim and desire to protect by Letters Patent is:

1. The method of removing diphenylamine from smokeless powder which includes extracting smokeless powder with a mixture of liquids, the mixture being chemically non-reactive with the powder and having a capacity to dissolve diphenylamine and a solvent power on nitrocellulose sufficient to swell the powder at least 100% without dissolving any substantial amount thereof.

2. The method of removing diphenylamine from smokeless powder which includes treating the powder with an organic liquid, a solvent for nitrocellulose and for diphenylamine in admixture with a liquid, a non-solvent for nitrocellulose, the mixture being chemically non-reactive with the powder and having a capacity to swell the powder at least 100% without dissolving any substantial amount thereof.

3. The method of removing diphenylamine from smokeless powder which includes treating the powder with an organic liquid, a solvent for nitrocellulose and for diphenylamine in admixture with a liquid, a non-solvent for nitrocellulose, the liquid a non-solvent for nitrocellulose being in amount such that the liquid a solvent for nitrocellulose will act to swell the powder at least 100% without dissolving any substantial amount thereof and the mixture being chemically non-reactive with the powder.

4. The method of removing diphenylamine from smokeless powder which includes treating the powder with an aliphatic alcohol which is a solvent for nitrocellulose and diphenylamine in admixture with a liquid a non-solvent for nitrocellulose in such amount that the mixture will swell the powder at least 100% without dissolving any substantial amount thereof and the mixture being chemically non-reactive with the powder.

5. The method of removing diphenylamine from smokeless powder which includes treating the powder with an aliphatic alcohol which is a solvent for the nitrocellulose and diphenylamine in admixture with a liquid aromatic hydrocarbon in such amount that the mixture will swell the powder at least 100% without dissolving any substantial amount thereof and the mixture being chemically non-reactive with the powder.

6. The method of removing diphenylamine from smokeless powder which includes extracting the smokeless powder with methyl alcohol in admixture with a liquid a non-solvent for nitrocellulose in such amount that the mixture will swell the powder at least 100% without dissolving any substantial amount thereof and the mixture being chemically non-reactive with the powder.

7. The method of removing diphenylamine from smokeless powder which includes extracting the smokeless powder with methyl alcohol in admixture with a liquid aromatic hydrocarbon in such amount that the mixture will swell the powder at least 100% without dissolving any substantial amount thereof and the mixture being chemically non-reactive with the powder.

8. The method of removing diphenylamine from smokeless powder which includes extracting the powder with an organic liquid solvent for nitrocellulose and diphenylamine in admixture with benzol, the mixture having a capacity to swell the powder at least 100% without dissolving any substantial amount thereof and being chemically non-reactive with the powder.

9. The method of removing diphenylamine from smokeless powder which includes extracting the powder with methyl alcohol in admixture with benzol, the mixture having the capacity to swell the powder at least 100% without dissolving any substantial amount thereof.

10. The method of removing diphenylamine from smokeless powder which includes extracting the powder with ethyl alcohol and ethyl acetate in admixture, the ethyl acetate being so proportioned to the ethyl alcohol as to limit its solvent power on the powder to that sufficient to swell the powder at least 100% without dissolving any substantial amount thereof.

11. The method of removing diphenylamine from smokeless powder which includes extracting the powder with ethyl alcohol and ethyl acetate in admixture, the ethyl acetate being so proportioned to the ethyl alcohol as to limit its solvent power on the powder to that sufficient to swell the powder without dissolving any substantial amount thereof.

12. The method of removing diphenylamine from smokeless powder which includes extracting the powder with ethyl alcohol, benzol and ethyl acetate in admixture, the ethyl acetate being so proportioned to the ethyl alcohol and benzol as to limit its solvent power on the powder to that sufficient to swell the powder without dissolving any substantial amount thereof.

13. The method of removing diphenylamine from smokeless powder which includes extracting the powder with ethyl alcohol and methyl alcohol in admixture, the ethyl alcohol being so proportioned to the methyl alcohol as to limit its solvent power on the powder to that sufficient to swell the powder at least 100% without dissolving any substantial amount thereof.

14. The method of removing diphenylamine from smokeless powder which includes extracting the powder with ethyl alcohol and methyl alcohol in admixture, the ethyl alcohol being so proportioned to the methyl alcohol as to limit its solvent power on the powder to that sufficient to swell the powder without dissolving any substantial amount thereof.

15. The method of removing diphenylamine from smokeless powder which includes extracting the powder with a liquid a solvent for diphenylamine and for nitrocellulose and a diluent liquid in admixture, the diluent liquid being present in amount sufficient to limit the nitrocellulose solvent power of the solvent for diphenylamine and nitrocellulose so that it will swell the nitrocellulose at least 100% without dissolving any substantial amount thereof and the mixture being chemically non-reactive with the powder.

16. The method of removing diphenylamine from smokeless powder which includes subjecting smokeless powder to treatment with a mixture of liquids including ethyl alcohol and ethyl acetate proportioned so that the mixture will have a capacity for swelling the powder at least 100% without dissolving any substantial amount thereof at a temperature upwards of the boiling point of the mixture.

17. The method of removing diphenylamine from smokeless powder which includes subjecting smokeless powder to treatment with a mixture of liquids including ethyl alcohol and ethyl acetate proportioned so that the mixture will have a capacity for swelling the powder without dissolving any substantial amount thereof at a temperature upwards of the boiling point of the mixture.

18. The method of removing diphenylamine from smokeless powder which includes extracting the powder with a mixture of ethyl alcohol and acetone, the ethyl alcohol being so proportioned to the acetone as to limit its solvent power on the powder to that sufficient to swell the powder without dissolving any substantial amount thereof.

In testimony of which invention, I have hereunto set my hand, at Athol, Mass., on this 10th day of Sept., 1930.

ROWLAND B. MITCHELL.